US005471146A

United States Patent [19]

Krayeski et al.

[11] Patent Number: 5,471,146

[45] Date of Patent: Nov. 28, 1995

[54] METHOD AND APPARATUS FOR MEASURING RETURN LOSS

[75] Inventors: Paul D. Krayeski, Plantation; Paul D. Marko, Fort Lauderdale; Stelios J. Patsiokas, Plantation, all of Fla.

[73] Assignee: Motorola, Inc., Schaumburg, Ill.

[21] Appl. No.: 76,218

[22] Filed: Jun. 14, 1993

[51] Int. Cl.[6] .......... H04B 1/00

[52] U.S. Cl. .......... 324/637; 455/67.1; 455/115; 455/226.1; 455/226.2

[58] Field of Search .......... 324/637, 642, 324/645, 646; 455/67.1, 115, 226.1, 226.2, 54.2, 63, 73, 88; 333/109

[56] References Cited

U.S. PATENT DOCUMENTS 4,485,486 11/1984 Webb et al. .......... 455/33.3
4,829,554 5/1989 Barnes et al. .......... 455/33.1
4,868,885 9/1989 Perry .......... 455/226.2
4,980,656 12/1990 Duffalo et al. .......... 455/126
5,129,098 7/1992 McGirr et al. .......... 455/67.1
5,287,555 2/1994 Wilson et al. .......... 455/115
5,289,526 2/1994 Chymyck et al. .......... 455/67.1

*Primary Examiner*—Kenneth A. Wieder
*Assistant Examiner*—Christopher M. Tobin
*Attorney, Agent, or Firm*—Pablo Meles; John H. Moore; Daniel K. Nichols

[57] ABSTRACT

A return loss meter (100) for base stations comprises a first transceiver (10) having a first transmitter (12), a first receiver (22 and 30), and a first antenna (20), a second transceiver (50) having a second transmitter (52), a second receiver (62 and 70), and a second antenna (60), wherein the first transceiver and the second transceiver are cross-coupled using at least one directional coupler (16) capable of being switched. The return loss meter includes a device for measuring reflected and transmitted power of the first antenna via a first directional coupler (16) capable of being switched and via a device (74) capable of measuring received signal strength at the second receiver and a device for measuring reflected and transmitted power of the second antenna via a second directional coupler (56) capable of being switched and via a device (34) capable of measuring received signal strength at the first receiver.

14 Claims, 3 Drawing Sheets

METHOD AND APPARATUS FOR MEASURING RETURN LOSS

TECHNICAL FIELD

This invention relates generally to a method and apparatus for measuring return loss at an antenna and in particular, to a method and apparatus using cross coupled transceivers to measure return loss in a multi-transceiver base station system.

BACKGROUND

New low power personal communications products such as the Motorola CT-2 System, require a large number of base stations in order to provide wide area service coverage. In these type products, a service provider is required to put forth a monumental effort to ensure the functionality of their system. One very troublesome problem, is determining the functionality and integrity of the base station's antenna after the initial installation of the system. Many service providers spend a great deal of time manually inspecting antennas at each base station for damage due to vandalism and natural deterioration. This process consumes a great deal of resources and time as providers maintain up to 10,000 stations or more. Furthermore, simple existing methods for measuring return loss for a CT-2 or PCS type systems will be subject to a substantial amount of out -of- band interference due to the close proximity to high power wide area systems such as 800 megahertz trunking systems or cellular systems. Therefore, a need exists for an economical and practical method and apparatus for obtaining a diagnostic return loss measurement at the station's antenna port to determine the integrity of the antenna. Such a method would preferably allow the service provider to remotely examine the functionality of the antenna without raising from radio frequency systems operating in adjacent frequency bands.

SUMMARY OF THE INVENTION

In one aspect of the invention, a return loss meter for base stations, comprises a first transceiver having a first transmitter, a first receiver, and a first antenna, and a second transceiver having a second transmitter, a second receiver, and a second antenna. The meter further comprises a device for measuring reflected and transmitted power of the first antenna via a first directional coupler capable of switching and via a device capable of measuring received signal strength at the second receiver, and a device for measuring reflected and transmitted power of a second antenna via a second directional coupler capable of switching and via a device capable of measuring received signal strength at the first receiver.

A second aspect of the present invention comprises a directional coupler capable of being switched for use in a return loss meter in a base station. The directional coupler comprises a coupler having a first input port and a second input port and a first output port and a second output port, the first input port receives transmitted power from a transmitter port, while the second input port receives reflected power and out of band energy from an antenna port. The first output port provides coupled transmitted power through a first attenuator while the second output port provides coupled reflected power and out of band energy through a second attenuator. Finally, the directional coupler comprises a switching device for providing a desired coupled power output for measuring return loss.

In another aspect, the present invention comprises a method for remotely measuring return loss of an antenna in a base station having a plurality of transceivers comprising the steps at a base station of cross coupling a first transmitter to a second receiver, cross coupling a second transmitter to a first receiver, measuring coupled power of the first transmitter through a device capable of measuring a received signal strength at the second receiver, and finally measuring coupled power of the second transmitter through a device capable of measuring a received signal strength at the first receiver.

DETAILED DESCRIPTION OF THE PREFERRED EMBODIMENT

This invention provides an economical method for determining the integrity of a base stations's antenna through a diagnostic return loss measurement. This invention will be of great help to PCS service or telepoint service operators that must maintain a large number of stations in their service area.

The quality of a Radio Frequency (RF) interconnection can be quantified by the ratio of RF power transmitted through the interconnection to the amount of RF power applied. An alternative measure that is used frequently is the reflection coefficient. This quantity is defined as the ratio of RF power reflected from the interconnection to RF power applied to the interconnection (incident at the antenna). The RF power reflected and the RF power applied are both values incident at the antenna. A value of zero (0) corresponds to no reflected power and a value of 1 corresponds to total reflection of power, and thus zero transmitted power through the antenna. This quantity expressed in decibels is called the return loss of the interconnection.

A simplistic power detection device such as a diode could be utilized for power measurements in many applications. However, the frequency bands in the CT-2 and other PCS systems operate in close proximity to higher power wide area systems such as the 800 megahertz trunking systems or cellular systems in many countries. This large out-of-band interference will make accurate detection of reflected power difficult. To overcome this problem, this invention cross-couples the transmitted and received energies into a diagnostic tool to operate in the presence of large out-of-band interference. This selectivity is gained with no additional cost, as stations employ multiple transceivers. In other words, the traffic bearing transceivers (transceivers used to transmit and receive voice and/or data information) used during a non-diagnostic mode are the same transceivers used during diagnostic mode. There are no external transceivers required for the present invention, although use of an external transceiver is contemplated to be within the scope of the present invention.

Figure 1:
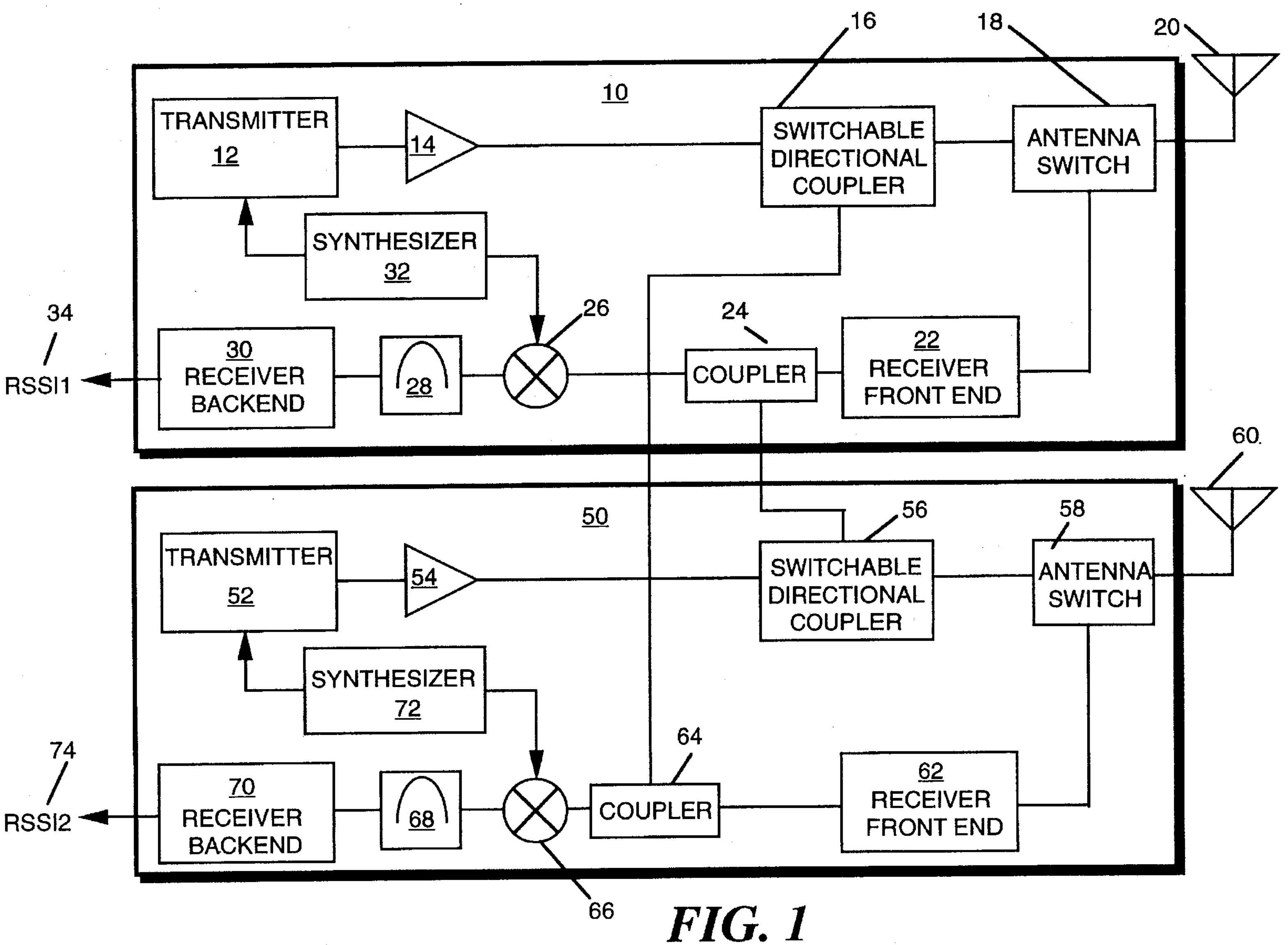
FIG. 1 is an electrical block diagram of an apparatus for measuring return loss in a CT-2 or PCS system in accordance with the present invention.

Referring to FIG. 1, there is shown a block diagram of the return loss meter configuration 100 preferably within a dual radio frequency transceiver module employing a dual directional coupler to sense the RF energy applied to and reflected from the antenna ports in accordance with the present invention. The dual radio frequency transceiver module preferably comprises a first transceiver 10 having a first transmitter 12 coupled an RF power amplifier 14. The transmitter 12 is preferably coupled to the receiver portion of the transceiver 10 via a synthesizer 32 and a mixer 26. The receiver portion of the transceiver 10 preferably includes a receiver front end 22 coupled to a receiver back end 30 via a coupler 24, the mixer 26 and a band pass filter 28. An antenna switch 18 allows the transceiver 10 to appropriately switch from the receiver portion (22 and 30) to the transmitter portion 12. In a diagnostic mode, signals received by the antenna 20 and signals from the transmitter 12 (and RF amplifier 14) are selectively coupled via a directional coupler 16 capable of switching to provide the receiver backend 70 of the second transceiver 50 with a signal that can either provide a measurement of the coupled transmitted power or a measurement of the coupled reflected power (with some out of band energy).

The dual radio frequency transceiver module further comprises a second transceiver 50 having a transmitter 52 coupled an RF power amplifier 54. The transmitter 52 is preferably coupled to the receiver portion of the transceiver 50 via a synthesizer 72 and a mixer 66. The receiver portion of the transceiver 50 preferably includes a receiver front end 62 coupled to a receiver back end 70 via a coupler 64, the mixer 66 and a band pass filter 68. An antenna switch 58 allows the transceiver 50 to appropriately switch from the receiver portion (62 and 70) to the transmitter portion 52. In a diagnostic mode, signals received by the antenna 60 and signals from the transmitter 52 (and RF amplifier 54) are selectively coupled via a directional coupler 56 capable of switching to provide the receiver backend 30 of the first transceiver 10 with a signal that can either provide a measurement of the coupled transmitted power or a measurement of the coupled reflected power (with some out of band energy).

During a diagnostic mode, the transceiver 10 is placed in constant transmit mode. Preferably, the dual directional coupler 16 then senses the transmitted power from the transmitter 12 (and preferably the Radio Frequency (RF) amplifier 14) and the reflected power from the antenna 20 via the antenna switch 18. The reflected power contains undesired out of band energy that can skew the measurement's accuracy if a wideband detector is utilized for the RF power measurements. This invention circumvents the accuracy problem by coupling via the coupler 64 the signals into the backend (70) of a receiver of the second transceiver 50. The out of band energy that is measured in the reflected power measurement is mostly filtered by the receiver backend 70, preferably using surface acoustic wave (SAW) filters (not shown). Tuning transceiver 50's receiver to the same channel or frequency on which transceiver 10 is transmitting then allows transceiver 50's Receive Signal Strength Indicator (RSSI) (74) measurement to perform the desired RF power measurements. The RSSI measurements are typically voltage level measurements that vary in accordance with the received signal strength.

Antenna switch 58 and the receiver front end 62 are configured for maximum isolation between the antenna 60 and the coupler 64 when the receiver backend 70 is taking measurements from the directional coupler 16. This is accomplished by turning off the receiver front end 62 and configuring the antenna switch 58 in the transmit mode.

Likewise during a diagnostic mode, the transceiver 50 is placed in constant transmit mode. Preferably, the dual directional coupler 56 then senses the transmitted power from the transmitter 52 (and preferably the Radio Frequency (RF) amplifier 54) and the reflected power from the antenna 60 via an antenna switch 58. This reflected power also contains undesired out of band energy that can skew the measurement's accuracy if a wide band detector is utilized for the RF power measurements. Again, this invention circumvents the accuracy problem by, coupling via coupler 24 the signals into the backend (30) of the receiver of the transceiver 10. The out of band energy that is measured in the reflected power measurement is mostly filtered by the receiver backend 30, preferably using surface acoustic wave (SAW) filters (not shown). Tuning the receiver of the transceiver 10 to the same channel or frequency on which transceiver 50 is transmitting then allows transceiver 10's Receive Signal Strength Indicator (RSSI) (34) measurement to perform the desired RF power measurements.

Antenna switch 18 and the receiver front end 22 are configured for maximum isolation between the antenna 20 and the coupler 24 when the receiver backend 30 is taking measurements from the directional coupler 56. This is accomplished by turning off the receiver front end 22 and configuring the antenna switch 18 in the transmit mode.

Figure 2:
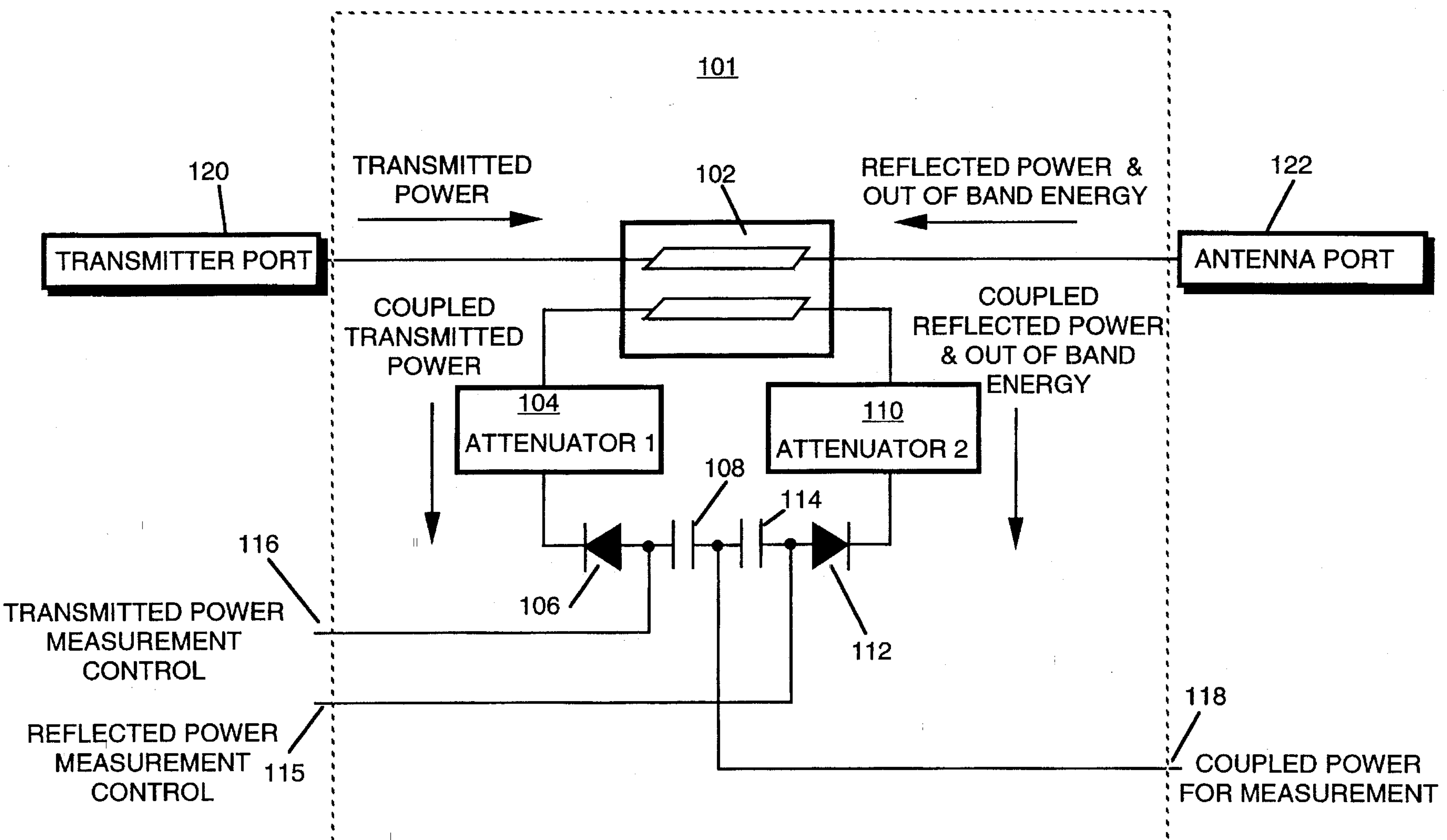
FIG. 2 is a circuit diagram of a directional coupler capable of switching in accordance with the present invention.

When measuring return loss (VSWR) of a well matched antenna, there is a substantial difference between the reflected and incidental power at the antennas. Preferably, attenuators 104 and 110 are adjusted so that the coupled power (118) will be at substantially equivalent levels suitable for accurate comparable measurements. Optionally, quarter wave transmission lines and PIN diodes (not shown) can be utilized to select which signal will be applied to the receiver. But preferably, the present invention uses a directional coupler 101 capable of being switched. The directional coupler 101 comprises a coupler 102 having a first input port for receiving transmitted power from a transmitter port 120, a second input port for receiving reflected power and out of band energy from an antenna port 122, a first output port for providing coupled transmitted power through the first attenuator 104 and a second output port fro providing coupled reflected power and out of band energy through the second attenuator 110. Finally, the directional coupler 101 comprises a switching means for providing a desired coupled power output 118 for measuring return loss. The switching means preferably comprises a pair of diodes 106 and 112 and a pair of capacitors 108 and 114 coupled between the first attenuator 104 and the second attenuator 106 as shown in FIG. 2. These four discrete devices can be selectively operated to provide a through line for the coupled transmitted power and an open circuit for the coupled reflected power in one mode, and a through line for the coupled reflected power and an open circuit for the coupled transmitted power in a second mode. The operation of the switching means are controlled by one of two control signals 115 or 116. Setting either control signal high will forward bias the appropriate diode creating a through-line. The other diode will be reversed biased and provide an open circuit. This open circuit when combined with the particular branch's attenuator will create a good 50 ohm impedance for the coupler's operation.

Figure 3:
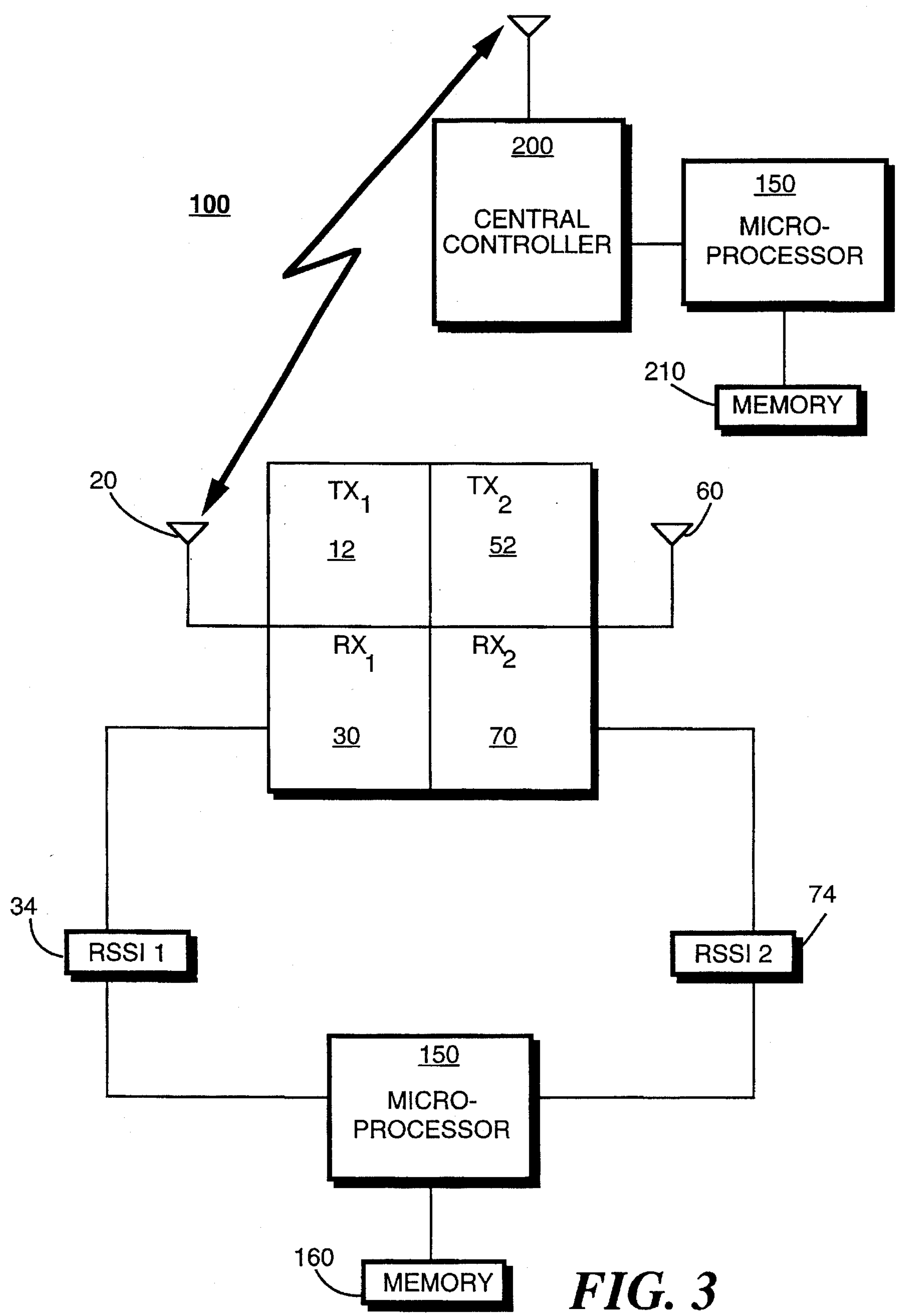
FIG. 3 is a block diagram of a system using a cross coupled return loss meter in accordance with the present invention.

Referring to FIG. 3, the RSSI values are read by a microprocessor 150 in the system 100 to perform the power comparison and thereby determine the antenna's integrity. The microprocessor can be resident and coupled to the dual transceiver configuration or optionally in a remote central controller 200. Additionally, these RSSI measurements can be compared with values stored in a memory 210 at a central controller 200 during systems installation or stored in a memory 160 coupled to the microprocessor 150 within the system 100. This will determine if there has been a degradation over time in the antenna integrity.

In applications such as CT-2, base station diagnostics can be initiated by a central control center. This invention economically adds antenna system integrity to the lists of system checks that can be performed in a remote fashion. The present invention removes the burden of visiting thousands of sites to manually inspect each base station's antenna system.

What is claimed is:

1. A return loss meter for base stations, comprising:

a first transceiver having a first transmitter, a first receiver, and a first antenna;

a second transceiver having a second transmitter, a second receiver, and a second antenna, wherein the first transceiver and the second transceiver are coupled and are both within the base station;

means for measuring reflected and transmitted power of the first antenna via a first directional coupler capable of being switched between the first antenna and the second receiver and via a device capable of measuring received signal strength at the second receiver;

means for measuring reflected and transmitted power of the second antenna via a second directional coupler capable of being switched between the second antenna and the first receiver and via a device capable of measuring received signal strength at the first receiver, wherein the first directional coupler and the second directional coupler comprise a dual directional coupler coupled to a first anttenuator and a second attenuator and wherein the dual directional coupler, comprises a coupler having a first input port and a second input port and first output port and a second output port, the first input port receives transmitted power from the first transmitter, while the second input port receives reflected power and out of band energy from the second antenna, the first output port provides coupled transmitted power through the first attenuator while the second output port provides coupled reflected power and out of band energy through the second attenuator and a switching means for providing a desired coupled power output for measuring return loss.

2. The return loss meter of claim 1, wherein the first and second attenuators are coupled to their respective first or second receives via a pair of quarter wave transmission lines.

3. The return loss meter of claim 1, wherein the meter further comprises a microprocessor that samples RSSI measurements and stores a history of the measurements in a memory coupled to the microprocessor forming a database.

4. The return loss meter of claim 1, wherein a reflection coefficient is determined for the first antenna from the means for measuring reflected and transmitted power of the first antenna.

5. The return loss meter of claim 1, wherein a reflection coefficient is determined for the second antenna from the means for measuring reflected and transmitted power of the second antenna.

6. The return loss meter of claim 1, wherein the first and second transceivers are both traffic bearing transceivers used during a non-diagnostic mode, the same transceivers used during diagnostic mode.

7. A return loss meter for base stations, comprising:

a first transceiver having a first transmitter and a first receiver;

a second transceiver having a second transmitter and a second receiver;

means for cross coupling the first transmitter to the second receiver and the second transmitter to the first receiver;

means for measuring coupled power of the first transmitter using the Received Signal Strength Indicator of the second receiver;

means for measuring coupled power of the second transmitter using the Received Signal Strength Indicator of the first receiver;

means for measuring transmitted power of the first transmitter via a switched directional coupler using the RSSI of the second receiver;

means for measuring the transmitted power of the second transmitter via the switched directional coupler using the RSSI of the first receiver.

8. The return loss meter of claim 7, wherein the means for cross coupling comprises a dual directional coupler coupled to a first attenuator and a second attenuator.

9. The return loss meter of claim 7, wherein the meter further comprises a microprocessor that samples the RSSI measurements and stores a history of the measurements in a memory coupled to the microprocessor forming a database.

10. The dual directional coupler of claim 1, wherein the switching means comprises a pair of diodes and a pair of capacitors coupled between the first and second attenuators, wherein the switching means is arranged and constructed to provide a through line for the coupled transmitted power and an open circuit for the coupled reflected power in one mode, and a through line for the coupled reflected power and an open circuit for the coupled transmitted power in a second mode.

11. A method for remotely measuring return loss of an antenna in a base station having a plurality of transceivers, comprising the steps of:

at the base station:

cross coupling a first transmitter having a first antenna to a second receiver backend;

cross coupling a second transmitter having a second antenna to a first receiver backend;

measuring reflected and transmitted power of the second antenna via a second directional coupler capable of being switched between the second antenna and the first receiver backend and via a device capable of measuring received signal strength at the first receiver backend, wherein a first directional coupler and the second directional coupler comprise a dual directional coupler coupled to a first attenuator and a second attenuator and wherein the dual directional coupler, comprises a coupler having a first input port and a second input port and first output port and a second output port, the first input port receives transmitted power from the first transmitter, while the second input port receives reflected power and out of band energy from the second antenna, the first output port provides coupled transmitted power through the first attenuator while the second output port provides coupled reflected power and out of band energy through the second attenuator and a switching means for providing a desired coupled power output for measuring return loss.

12. The method of claim 11, wherein the method further comprises the step of measuring coupled power of the second transmitter through a device capable of measuring a received signal strength at the first receiver.

13. The method of claim 11, wherein the method includes the step of using a directional coupler capable of switching to alternatively provide coupled transmitted power or provide coupled reflected power received at the antenna.

14. The method of claim 11, wherein the method comprises the step of using the first receiver and the first transmitter and the second receiver and the second transmitter as both the traffic bearing transceivers during a non-diagnostic mode and as the transceivers used during a diagnostic mode.

* * * * *

UNITED STATES PATENT AND TRADEMARK OFFICE

CERTIFICATE OF CORRECTION

PATENT NO. : 5,471,146

DATED : November 28, 1995

INVENTOR(S) : Krayeski, et al.

It is certified that error appears in the above-indentified patent and that said Letters Patent is hereby corrected as shown below:

Claim 2, Column 5, Line 47, change "receives" to --receivers--.

Signed and Sealed this

Eleventh Day of June, 1996

Attest:

BRUCE LEHMAN

Attesting Officer

Commissioner of Patents and Trademarks